(12) United States Patent  (10) Patent No.: US 8,504,238 B2
Yu et al.  (45) Date of Patent: Aug. 6, 2013

(54) VEHICLE STABILITY AND STEERABILITY CONTROL VIA ELECTRONIC TORQUE DISTRIBUTION

(75) Inventors: Hai Yu, Canton, MI (US); Wei Liang, Farmington Hills, MI (US); Ming Lang Kuang, Canton, MI (US); Ryan Abraham McGee, Ann Arbor, MI (US)

(73) Assignee: Ford Global Technologies, Dearborn, MI (US)

( * ) Notice: Subject to any disclaimer, the term of this patent is extended or adjusted under 35 U.S.C. 154(b) by 515 days.

(21) Appl. No.: 12/761,913

(22) Filed: Apr. 16, 2010

(65) Prior Publication Data

US 2011/0257826 A1  Oct. 20, 2011

(51) Int. Cl.
*B60W 10/00* (2006.01)
(52) U.S. Cl.
USPC ............................................ 701/29.2; 701/41
(58) Field of Classification Search
USPC .......................................................... 701/29
See application file for complete search history.

(56) References Cited

U.S. PATENT DOCUMENTS

| | | | |
|---|---|---|---|
| 7,248,957 B2 | 7/2007 | Billig | |
| 7,337,053 B2 | 2/2008 | Piyabongkarn et al. | |
| 7,491,145 B2 | 2/2009 | Mizon et al. | |
| 7,634,338 B2 | 12/2009 | Kaltenbach et al. | |
| 2005/0228564 A1* | 10/2005 | Kato et al. | 701/41 |
| 2007/0192011 A1* | 8/2007 | Piyabongkarn et al. | 701/70 |
| 2008/0004780 A1 | 1/2008 | Watanabe et al. | |
| 2008/0059022 A1 | 3/2008 | Shimodaira et al. | |
| 2008/0288149 A1 | 11/2008 | Drenth | |
| 2009/0118950 A1 | 5/2009 | Heap et al. | |

OTHER PUBLICATIONS http://sciencelinks.jp/j-east/article/200304/000020030403A0071970.php, Science Links Japan, Improving Handling and Stability of Small-Scale Electric Vehicle "NOVEL" by Traction Torque Control, pp. 1.

* cited by examiner

*Primary Examiner* — Thomas Tarcza
*Assistant Examiner* — Maceeh Anwari
(74) *Attorney, Agent, or Firm* — Angela M. Brunetti; Raymond Coppiellie

(57) ABSTRACT

A system for distributing propulsion to front and rear axles of a vehicle includes: a front axle motor coupled to the front axle and a rear axle motor coupled to the rear axle. An electronic control unit (ECU) electronically coupled to the motors commands the rear axle motor to increase torque supplied to the rear axle during understeer and commands the front axle motor to increase torque supplied to the front axle during oversteer. A method to distribute propulsion to front and rear axles of a vehicle includes estimating actual yaw rate, estimating desired yaw rate, providing electrical energy to the front axle motor during oversteer, and providing electrical energy to the rear axle motor during understeer. Additionally, electrical energy may be extracted from the rear axle motor during oversteer and electrical energy may be extracted from the front axle motor during understeer.

15 Claims, 3 Drawing Sheets

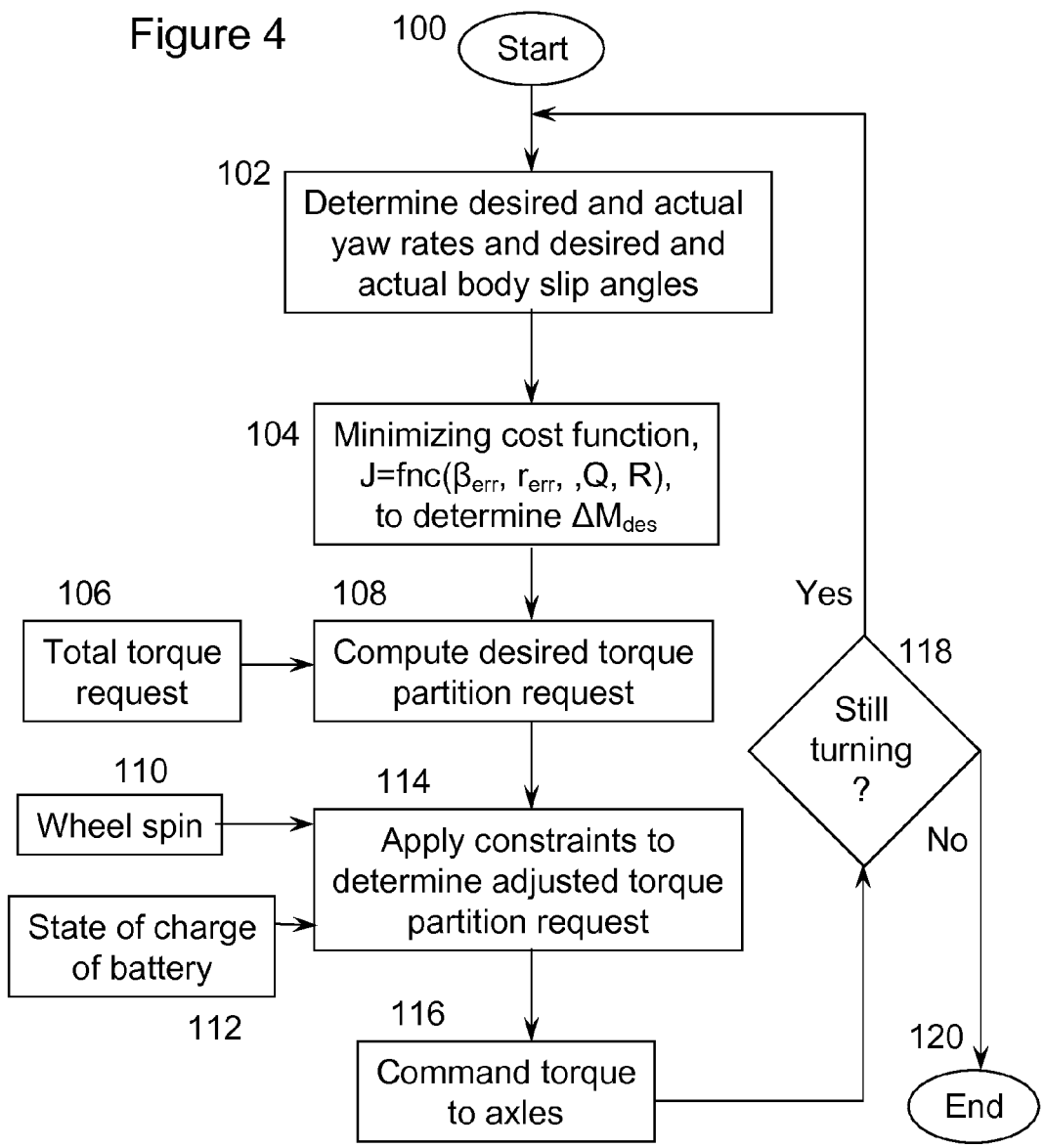

VEHICLE STABILITY AND STEERABILITY CONTROL VIA ELECTRONIC TORQUE DISTRIBUTION

BACKGROUND

1. Technical Field

The present disclosure relates to vehicle control systems that enhance vehicle stability and performance.

2. Background Art

Stability-control systems are increasingly being used in automotive vehicles. In some prior two driven axle systems, a mechanical coupling is provided between the front and rear axles of the vehicle. In the event that one or both of the tires associated with the primary driven axle lose traction, the coupling apparatus, which is normally uncoupled, is commanded to couple the two axles so that torque is redistributed between a primary axle and a secondary axle. Although such a mechanical system provides improved performance compared to a purely braking approach such as with anti-lock braking systems, a mechanical system has several disadvantages. There is a delay between the time that the traction loss is detected and the mechanical coupler actually redistributes torque from the slipping tires of the primary axle to the wheels of the secondary. In situations such as encountering a patch of ice, in which road surface conditions can change very rapidly, a mechanical system is incapable of effecting a change in torque distribution sufficiently fast. Furthermore, due to frictional losses and torque transfer capability through the mechanical coupler, the sum of the torques supplied to the two axles is somewhat less than what the powertrain supplies to the primary axle. Thus, when the mechanical coupler is invoked, there is a drop in longitudinal performance of the vehicle, which may be particularly noticeable during acceleration. The ability of a mechanical system to redistribute torque may be limited in torque and further hampered by environmental influences, such as temperature.

A shift in torque distribution is also found to be useful in understeer and oversteer cornering situations. A mechanical coupler can be used to couple the primary and secondary axles to redistribute the torque between the axles such that the unexpected vehicle understeer or oversteer tendency is compensated. However, as with the desire to redistribute torque for a forward traveling vehicle encountering insufficient or excessive turning moment, the mechanical coupler reacts more slowly than desired and the torque redistribution is less accurately controlled in the coupler such that the operator of the vehicle notices a uncomfortable change in vehicle turning property.

SUMMARY

To overcome at least one problem in the background art, a method to distribute propulsion to front and rear axles of a vehicle is disclosed, which includes estimating actual yaw rate, estimating desired yaw rate, and providing electrical energy to a front axle motor during oversteer. Oversteer is when actual yaw rate exceeds desired yaw rate by more than a first threshold yaw rate. In addition, electrical energy may be extracted from a motor coupled to the rear axle during oversteer. Or, in the event that the rear axle motor is providing torque to the rear axle, electric energy supplied to the rear axle motor is reduced. In one embodiment, electrical energy extracted from the rear axle motor is provided directly to the front axle motor.

During understeer, electrical energy is provided to the rear axle motor. Also, electrical energy is extracted from the front axle motor during understeer. Electrical energy extracted from the front axle motor can be provided directly to the rear axle motor. The electrical energy extracted from the motor coupled to the front axle and the energy supplied directly to the motor coupled to the rear axle are provided in such a way that a longitudinal velocity of the vehicle is largely unaffected or that desired by the operator of the vehicle. Understeer is when desired yaw rate exceeds actual yaw rate by more than a second threshold yaw rate. Actual yaw rate is estimated based on sensors coupled to the vehicle. Or, depending on the sensor set, actual yaw rate is measured directly. Desired yaw rate is based on a sensor coupled to a steering wheel of the vehicle.

A system to distribute propulsion in a vehicle is disclosed that includes: a first axle coupled to the vehicle, an internal combustion engine coupled to the first axle, a first axle motor coupled to the first axle, a second axle coupled to the vehicle, a second axle motor coupled to the second axle, and an electronic control unit (ECU) electronically coupled to the engine and the axle motors. The ECU commands the second axle motor to increase torque supplied to the second axle when the vehicle is moving in a direction in which the first axle leads and the vehicle is in an understeer situation. The ECU commands the first axle motor to decrease torque supplied to the first axle when the vehicle is moving in a direction in which the first axle leads and the vehicle is in the understeer situation. The decreased torque is a braking torque such that electrical energy is generated by the first axle motor. In one embodiment, the electrical energy generated by the first axle motor is supplied to the second axle motor.

The system may include a steering sensor coupled to a steering wheel, a vehicle speed sensor, and a yaw rate sensor coupled to the vehicle and electronically coupled to the ECU. The ECU, which is electronically coupled to the sensors, determines a desired yaw rate based on a signal from the steering sensor and the vehicle speed sensor. The ECU further determines an actual yaw rate based on a signal from the yaw rate sensor. Or, depending on the sensor set, the ECU may estimate the actual yaw rate based on other sensors. An understeer situation is based on the desired yaw rate exceeding the actual yaw rate by more than a first threshold and an oversteer situation is based on the actual yaw rate exceeding the desired yaw rate by more than a second threshold.

The ECU commands a front axle motor to increase torque supplied to the front axle and the rear axle motor to decrease torque supplied to the rear axle when the vehicle is in an oversteer situation. The ECU commands the rear axle motor to increase torque supplied to the rear axle and the front axle motor to decrease torque supplied to the front axle when the vehicle is in an understeer situation. If a motor is supplying a positive torque to the axle to which it is coupled, the torque can be decreased as desired down to zero, at which point further decreases in torque are provided by operating the motor as a generator.

BRIEF DESCRIPTION OF THE DRAWINGS

FIG. 4 is a flowchart of a method for redistributing torque between the axles according to an embodiment of the disclosure.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
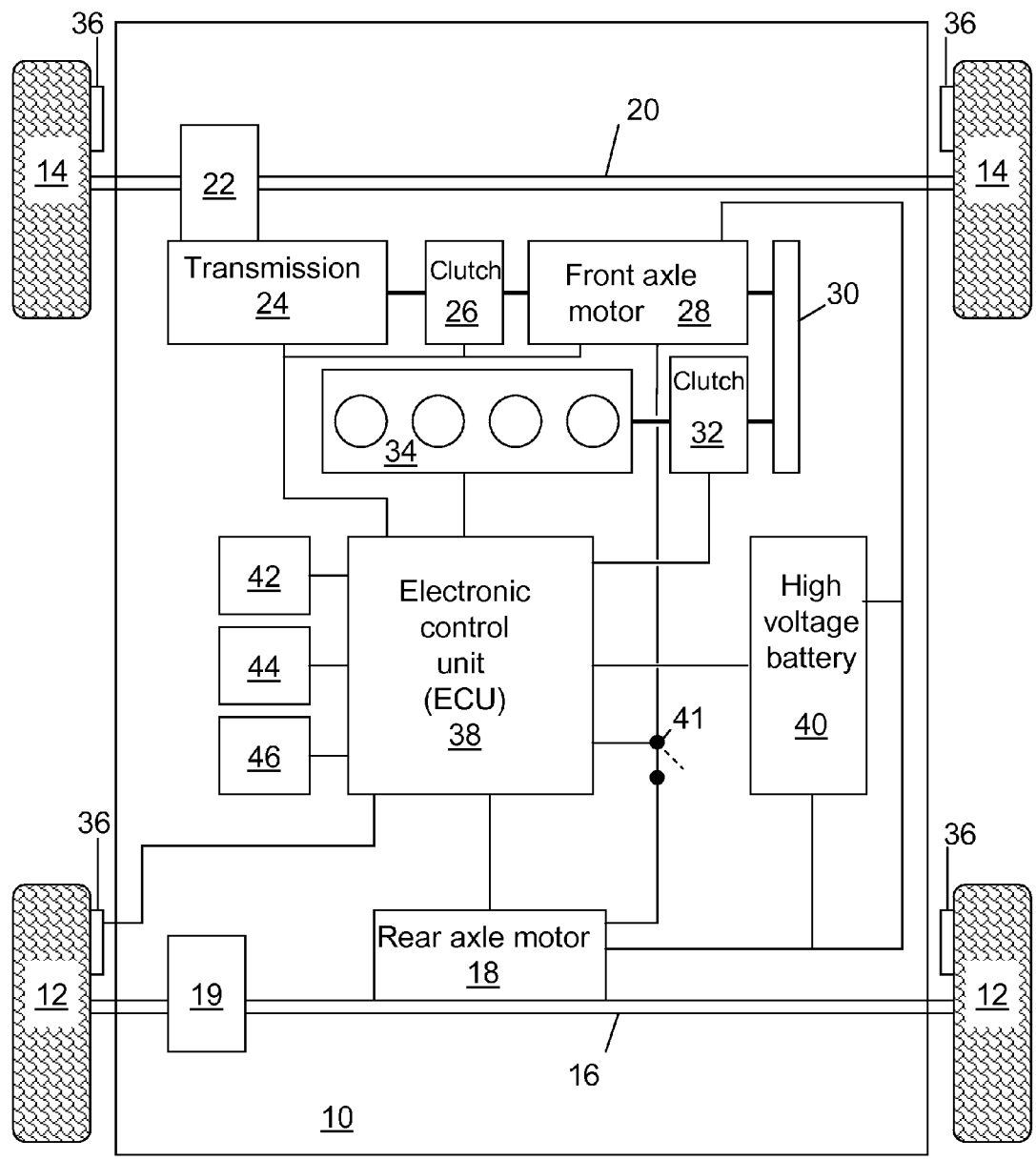
FIG. 1 shows a schematic representation of a hybrid electric vehicle (HEV)

In FIG. 1, one embodiment of a hybrid electric vehicle (HEV) 10 is shown schematically. Rear wheels 12 are coupled via rear axle 16 with a rear axle motor 18. Rear axle 16 has a differential 19. Front wheels 14 are coupled to front axle 20. A differential and final drive gear set 22 are coupled to front axle 20. The vehicle powertrain system is coupled to differential 22 through a transmission 24. Transmission 24 is coupled to a front axle motor 28 via a clutch 28. Front axle motor 28 is coupled to an internal combustion engine 34 via a clutch 32. Front axle motor 28, in the arrangement shown in FIG. 1, can be called an integrated starter generator (ISG) because it can be used to spin up engine 34 for starting purposes. Depending on the exact configuration, it is likely that all of the powertrain components cannot be coupled end to end within the width of HEV 10. In the embodiment shown in FIG. 1, a chain drive 30 is provided between engine 34 and front axle motor 28 such that engine 34 rotates along a first axis and front axle motor 28 and transmission 24 rotate along a second axis substantially parallel to the first axis. The configuration in FIG. 1 illustrates simply one HEV configuration. There are many alternatives for configuring HEV which do not depart from the scope of the present disclosure. HEV 10 shows an arrangement in which internal combustion engine 34 is coupled to the front wheels. In another embodiment, engine 34 is coupled to the rear axle. Front and rear axle motors 28 and 18 can operate as motors providing torque to the associated axle or as generators absorbing torque from the associated axle, i.e., providing a braking force on wheels associated with the axle.

Continuing to refer to FIG. 1, wheels 12 and 14 are provided with traction sensors 36, which are coupled to an ECU 38. Traction sensors 36, in one embodiment, are part of an anti-lock braking system (ABS). ABS compares vehicle speed with tire speed. When the two differ by more than a predetermined amount, the tire is determined to be slipping. ABS is simply one example; any suitable traction sensor can be used.

A battery 40 is coupled to rear axle motor 18 and front axle motor 28 to provide electrical energy or to absorb electrical, depending on operational mode. Battery 40 may also be electronically coupled to ECU 38 via sensors to monitor state of charge of the battery, battery health, etc. In one embodiment, battery 40 is a high voltage battery to facilitate large power extraction from or storage into the battery.

In one embodiment, ECU 38 is coupled to a yaw rate sensor 42, a sensor coupled to a steering wheel 44, and a variety of other sensors 46, such as a vehicle speed sensor, temperature sensors, transmission sensors, pressure sensors, and acceleration sensors. In embodiments without yaw rate sensor 42, yaw rate may be estimated based on signals from other sensors 46.

An HEV is shown in FIG. 1. In an alternative embodiment, the vehicle is an electric vehicle (EV) having a front axle motor and a rear axle motor. In such an embodiment, the following components are no longer included: clutch 26, chain drive 30, clutch 32, and engine 34. In some embodiments, transmission 24 is also not included.

Figure 2A:
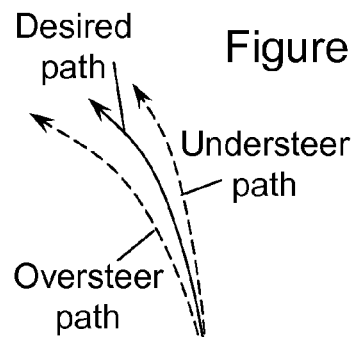
FIG. 2A shows a HEV on a desired turning path and oversteer and understeer paths.
Figure 2B:
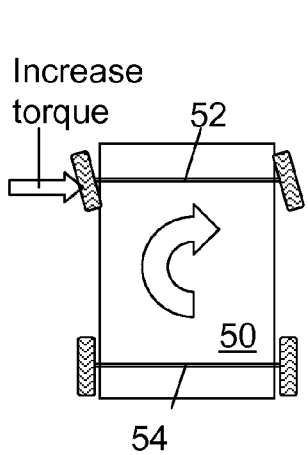
FIG. 2B shows how torque increase to a front axle of a HEV affects yaw rate in an oversteer case.

In FIG. 2A, a vehicle 50, either a HEV or EV, is shown during a turning maneuver. Wheels coupled to a front axle 52 are caused to turn via a steering input by the driver to the steering wheel (not shown). By the amount that the driver has turned the steering wheel, a desired path 56 for vehicle 50 can be determined. An example of an oversteer path 58 and an understeer path 60 are shown in FIG. 2A. To cause vehicle 50 to track along desired path 56 instead of oversteer path 58, torque is increased to front axle 52. Such a torque increase is possible by increasing torque provided by engine 34 or front axle motor 28, such as shown in FIG. 2B. A torque increase from front axle torque 28 is much more rapid than a torque increase from engine 34. Engine 34 suffers from intake manifold filling delays that hamper the engine's ability to rapidly increase engine torque. To rapidly respond to a determination that vehicle 50 is on an oversteer path 58, torque generated by front axle motor 28 is increased. In one example, front axle motor 28 is being operated as a motor, or not at all, when the command for increased torque is received. In this case, front axle motor 28 is commanded to provide a positive torque. In another example, front axle motor 28 is being operated as a generator when the command for increased torque is received. In this case, front axle motor 28 is commanded to reduce electrical generation. If a greater increase in torque is required than can be achieved by reducing electrical generation, front axle motor 28 is commanded to change from operating as a generator to operating as a motor. A torque increase, by commanding front axle motor 28 to apply torque to the front axle, causes the longitudinal propulsion of vehicle 50 to exceed the operator's request. Thus, in one embodiment, rear axle motor 18 applies a braking torque to axle 16. The torque increase to axle 20 and the torque decrease to axle 16 are determined to provide the desired path and longitudinal propulsion of vehicle 50.

Figure 2C:
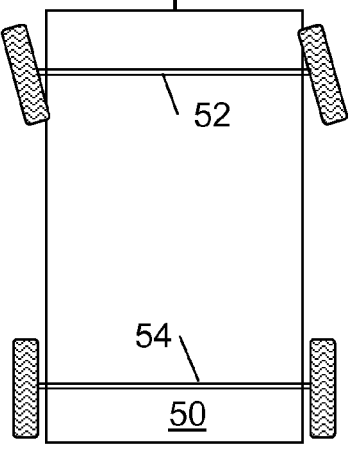
FIG. 2C shows how torque increase to a rear axle of a HEV affects yaw rate in an understeer case.

To respond to a determination that vehicle 50 is on an understeer path 60, torque is supplied to rear axle 16 by rear axle motor 18, such as that shown in FIG. 2C. To maintain the longitudinal propulsion of vehicle 50, front axle motor 28 is commanded to reduce torque applied to front axle 20.

Figure 3:
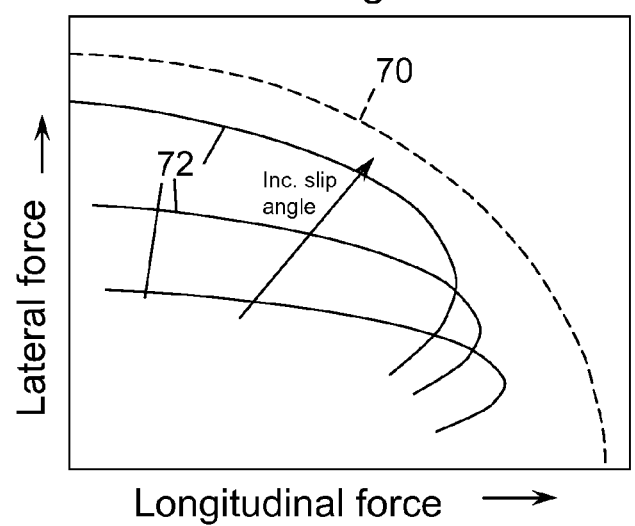
FIG. 3 is a graph of the friction circle or the tire traction field.

In FIG. 3, a tire force limit characteristic is plotted for the positive quadrant of the traction field. This is sometimes referred to as the friction circle 70. Because tires may be optimized for lateral or longitudinal traction, the family of curves 72 (as a function of slip angle) is not a circle, but an ellipse. The friction limit for a tire is determined by the coefficient of friction times the load. The available friction can be used for lateral force, longitudinal force, or a combination of the two. Thus, the curves in FIG. 3 show the limit of friction, with the tire slipping if the combination of the longitudinal and lateral forces causes falls outside the curve corresponding to the slip angle. A positive longitudinal force is an acceleration force and a negative longitudinal force is a braking force. By following one of the family of limit curves, it can be seen that when the tire longitudinal force increases, the available lateral force decreases and vice versa.

Figure 2D:
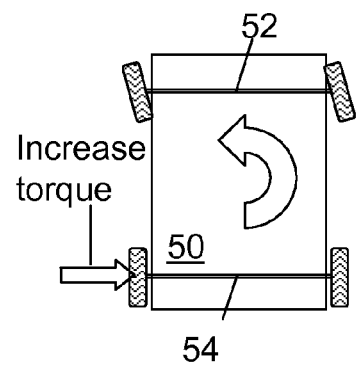
FIG. 2D shows a vehicle indicating distances between the center of gravity and the axles.
Figure 2D:
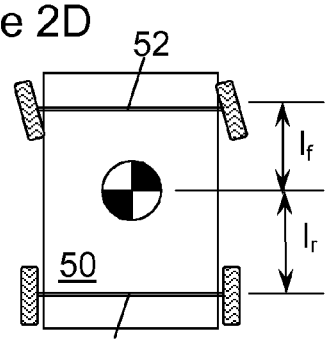

To supplement the available friction available to tires associated with one axle, if appropriate hardware is available on the vehicle, torque or motive force can be redistributed between the front and rear axles. For example, when propulsive force is redistributed from the rear axle to the front axle, the front axle lateral force will decrease $\Delta F_{yf}$ and the rear axle lateral force will increase $\Delta F_{yr}$. As a result, the vehicle yaw rate state will be changed and the variation of yaw moment is calculated as:

$$F_{yf\_new} = F_{yf} + \Delta F_{yf}$$

$$F_{yr\_new} = F_{yr} + \Delta F_{yr}$$

$$\Delta M_{yaw} = \Delta F_{yf} l_f - \Delta F_{yr} l_r$$

where $F_{yf\_new}$ and $F_{fr\_new}$ are the resultant front axle and rear axle lateral forces after the traction torque redistribution. In FIG. 2D, $l_f$ is shown as the distance between the center of gravity 80 of vehicle 50 and front axle 52; and $l_r$ is shown as the distance between the center of gravity 80 and rear axle 54. By taking advantage of advanced control methodology, such an auxiliary yaw moment, $\Delta M_{yaw}$ can be utilized either to enhance steering capability or to restrict excessive lateral vehicle dynamics without compromising the vehicle longitudinal performance. In a left turn maneuver, a positive $\Delta M_{yaw}$ may be used to correct excessive vehicle oversteer, such as shown in FIG. 2B. A negative $\Delta M_{yaw}$ may be used to compensate excessive vehicle understeer, such as shown in FIG. 2C.

The wheel torque that can be redistributed may be limited, however, due to the desire to avoid inducing wheel spin, i.e., insufficient traction between the tire and the surface, and limitations of the battery to provide the desired level of current to the traction motor due to the state of charge of the battery being insufficient or due to the temperature of the battery being too high.

The total available wheel torque to be redistributed depends on the current torque request level and the traction condition on the ground. To avoid control-induced wheel spin, a wheel slip controller/regulator is embedded in the traction controller at each axle to monitor the wheel slip and to regulate the wheel slip to a commanded optimal slip setpoint. In the presence of a solely electrical driven axle, the amount of total torque redistribution level may be further restricted by the vehicle's instantaneous power limit, battery discharge limit (a function of State of Charge (SOC) and temperature), electrical vehicle control mode and motor torque limit. All these factors will finally determine the maximum $\Delta M_{yaw}$ available for vehicle dynamic controls.

In FIG. 4, one embodiment of a control scheme is shown in a flowchart. The control scheme beginning with a turning request in block 100. In block 102, desired and actual vehicle yaw rates, $\gamma_{des}$ and $\gamma_{act}$, and desired and actual sideslip angles, $\beta_{des}$, and $\beta_{act}$, are determined based on driver inputs, sensor data, and vehicle dynamic states, such as vehicle speed, yaw rate, lateral acceleration, and longitudinal acceleration. It is desirable to minimize both yaw rate error, $\gamma_{des} - \gamma_{act}$, and body slip angle error, $\beta_{des}$, and $\beta_{act}$. However, providing a yaw rate adjustment does not simultaneously minimize both errors. In block 104, an optimized solution can be found, by minimizing a control objective function, such as:

$$J = \int_0^\infty ((Z_{act} - Z_{des})^T Q(Z_{act} - Z_{des}) + \Delta M_{des}^2 R) dt.$$

In the above equation $Z_{act} = [\beta_{act}, r_{act}]^T$ and $Z_{des} = [\beta_{des}, r_{des}]^T$. Q and R are positive definite cost weighting matrices. A desired yaw moment, $\Delta_{des}$ is determined. In block 108, a desired wheel torque partition request is determined with total wheel torque request 106, based on driver input, as an input to block 108.

In block 114, it is determined whether the torque partitions to the two axles are to be limited. For example, if the battery is not charged, then the motor can provide no torque to the axle. Thus, state of battery charge 112 is an input to block 114. Or, if it is determined that by commanding the torque computed in block 104 to one of the axles would cause wheels coupled to that axle to slip, the torque determined in block 106 is a torque that would avoid such a slip condition. Thus, wheel slip conditions 110 are input to block 114. If no limits are applied, there is no adjustment to the desired wheel torque (block 108) in block 114. The torque partitions of block 114 are commanded to the axles in block 116. Control passes to block 118, in which it is determined if the operator is still commanding a turn to the vehicle. If not, the control scheme ends in block 120. If so, control passes back to block 102 for repartitioning of torque between the axles throughout the turn.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. For example, it may be desirable to have an extensive set of sensors to provide an accurate assessment of the vehicle's movement. However, to maintain a desirable cost structure, a satisfactory estimation of some vehicle quantities may be ascertained by inferring from a lesser set of sensor data. The embodiments described as being less desirable relative to other embodiments with respect to one or more characteristics are not outside the scope of the disclosure as claimed.

What is claimed:

1. A system to distribute propulsion in a vehicle, the system comprising:
   a front axle and a rear axle coupled to the vehicle;
   a front axle motor coupled to the front axle;
   a rear axle motor coupled to the rear axle;
   an electronic control unit (ECU) electronically coupled to the front and rear axle motors, the ECU commanding the rear axle motor to increase torque supplied to the rear axle and decrease torque supplied to the front axle in an understeer condition; and
   wherein the decrease in torque supplied to the front axle is provided by reducing the electrical energy to the front axle motor when the front axle motor is operating as a motor and operating the front axle motor as a generator when the torque provided by the front axle motor is zero.

2. The system of claim 1, further comprising:
a steering wheel coupled to the vehicle;
a steering sensor coupled to the steering wheel and electronically coupled to the ECU;
a vehicle speed sensor;
a yaw rate sensor and a lateral acceleration sensor coupled to the vehicle and electronically coupled to the ECU, wherein the ECU determines a desired yaw rate and a desired sideslip angle of the vehicle based on signals from the steering sensor and the vehicle speed sensor and determines an actual yaw rate and an actual sideslip angle of the vehicle based on signals from the yaw rate sensor and the lateral acceleration sensor, wherein understeer comprises a magnitude of the desired yaw rate exceeding a magnitude of the actual yaw rate in the turning direction by more than a first threshold, and oversteer comprises a magnitude of the actual yaw rate exceeding a magnitude of the desired yaw rate in the turning direction by more than a second threshold.

3. The system of claim 1 wherein the electrical energy generated by the front axle motor is provided to the rear axle motor.

4. The system of claim 1 wherein the ECU commands the front axle motor to increase torque supplied to the front axle in an oversteer condition.

5. The system of claim 1 wherein the ECU commands the rear axle motor to decrease torque supplied to the rear axle in an oversteer condition.

6. The system of claim 1 wherein
the magnitude of the torque increase to the rear axle and the magnitude of the torque decrease to the front axle are based on providing an operator desired longitudinal propulsion of the vehicle.

7. The system of claim 1 wherein the ECU commands the front axle motor to increase torque supplied to the rear axle in an oversteer condition.

8. The system of claim 1 wherein:
the ECU commands the rear axle motor to decrease torque supplied to the rear axle in an oversteer condition; and
the magnitude of the torque decrease to the rear axle and the magnitude of the torque increase to the front axle are based on providing an operator desired longitudinal propulsion of the vehicle.

9. A method to distribute propulsion to front and rear axles of a vehicle, the method comprising:
estimating a desired yaw rate and a desired vehicle sideslip angle;
estimating an actual yaw rate and an actual vehicle sideslip angle;
increasing electrical energy to an electric motor coupled to the front axle during oversteer to minimize a weighted cost function based on a yaw rate error and a vehicle sideslip error;
increasing electrical energy to an electric motor coupled to the rear axle during understeer to minimize a weighted cost function of the yaw rate error and the vehicle sideslip error; and
decreasing electrical energy from the electric motor coupled to the front axle during understeer wherein the magnitude of the electrical energy decreases while the motor is being operated as a motor and the magnitude of the electrical energy increases when the motor is being operated as a generator.

10. The method of claim 9 wherein the yaw rate error is based on a difference between the actual yaw rate and the desired yaw rate; and the vehicle sideslip error is based on a difference between the desired vehicle sideslip and the actual sideslip.

11. The method of claim 9, further comprising:
extracting electrical energy from an electric motor coupled to the rear axle motor coordinated with the providing electrical energy to a front axle motor.

12. The method of claim 9, further comprising:
determining a desired auxiliary yaw moment based on minimizing the weighted cost function; and
determining an available auxiliary yaw moment, the available auxiliary yaw moment limited by at least one of: traction conditions for vehicle wheels, a state of charge of a battery coupled to the front axle motor, and a battery discharge limit of the battery wherein the electrical energy provided to the front axle motor and the electrical energy extracted from the rear axle motor are determined to provide the lesser of as magnitude of the desired auxiliary yaw moment and a magnitude of the available auxiliary yaw moment.

13. A method to distribute propulsion to front and rear axles of a vehicle, the method comprising:
estimating actual yaw rate;
estimating desired yaw rate;
extracting electrical energy from a motor coupled to the front axle when a magnitude of the desired yaw rate exceeds a magnitude of the actual yaw rate;
determining a desired auxiliary yaw moment based on causing the actual yaw rate to equal the desired yaw rate;
determining an available auxiliary yaw moment, the available auxiliary yaw moment limited by at least one of: traction conditions for vehicle wheels, a state of charge of a battery coupled to the front axle motor, and a battery discharge limit of the battery wherein the electrical energy provided to the front axle motor and the electrical energy extracted from the rear axle motor are determined to provide the lesser of the desired auxiliary yaw moment and the available auxiliary yaw moment; and
providing electrical energy to a rear axle motor coupled to the rear axle when a magnitude of the desired yaw rate exceeds a magnitude of the actual yaw rate.

14. The method of claim 13 wherein actual yaw rate is estimated based on a sensor coupled to the vehicle and desired yaw rate is based on a steering sensor.

15. The method of claim 13 wherein the electrical energy extracted from the motor coupled to the front axle and the energy supplied directly to the motor coupled to the rear axle are provided in such a way that a longitudinal velocity of the vehicle is largely unaffected.

* * * * *